May 1, 1923.

G. ENGEL, SR

FILTER

Filed Feb. 25, 1920

Inventor
Godfrey Engel Sr.
Attorney
E. W. Marshall

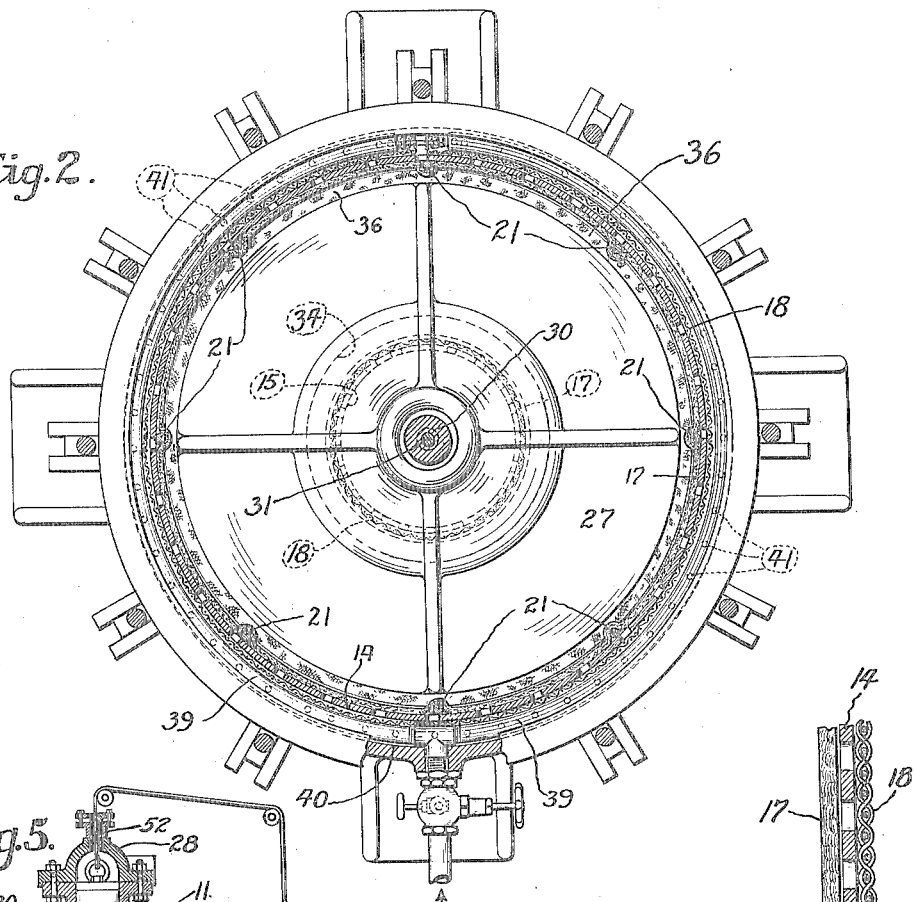
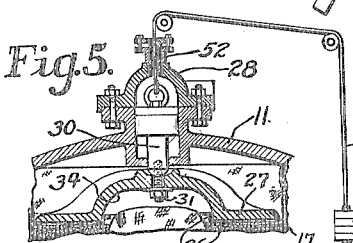
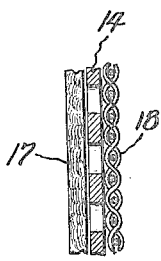
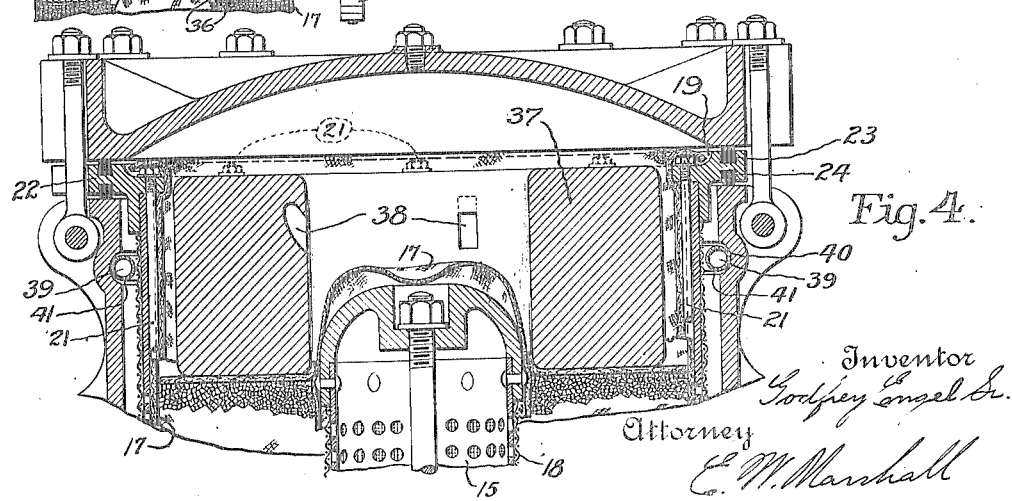

Patented May 1, 1923.

1,453,310

UNITED STATES PATENT OFFICE.

GODFREY ENGEL, SR., OF BROOKLYN, NEW YORK, ASSIGNOR TO BUFFALO FOUNDRY & MACHINE CO., OF BUFFALO, NEW YORK, A CORPORATION OF NEW YORK.

FILTER.

Application filed February 25, 1920. Serial No. 361,309.

*To all whom it may concern:*

Be it known that I, GODFREY ENGEL, Sr., a citizen of the United States, and resident of Brooklyn, county of Kings, and State of New York, have invented certain new and useful Improvements in Filters, of which the following is a specification.

This invention relates particularly to granular filters of the type disclosed in my Patent 733,174, special objects of the invention being to improve and to add to the efficiency of filters of such type.

Other objects are to insure proper treatment of all the liquid passing through the filter, to facilitate the washing out and cleansing of the filter, to prevent loss or escape of the granular filtering medium with the filtrate and to provide for the ready assemblage and disassemblage of the filter.

One of the features of the invention is the provision of a weight for applying pressure to the confined body of granular material, so as to hold the otherwise loose granules against such movement as would defeat their filtering purpose. This pressure applying means may be in the form simply of a weight, but preferably it is a power actuated device by means of which the pressure may be varied or removed, as occasion may require.

Other features relate to the provision of steam jets for flushing off the screen, to the provision of blankets over the screens for preventing escape of fine particles of the granular filtering medium and to structural details of the screen and its method of mounting in the casing.

The above and other novel features of the invention will all be described in detail in the course of the following specification, reference being had to the accompanying drawings forming a part hereof and in which I have illustrated one of the practical commercial embodiments of the invention.

Figure 1 in the drawings referred to, is a vertical sectional view of the filter.

Figure 2 is a transverse sectional view of the same as taken on substantially the plane of line 2—2 of Figure 1.

Figure 3 is an enlarged broken sectional view of the screen elements of the filter.

Figure 4 is a broken sectional view of a slightly modified form of the invention.

Figure 5 is a broken detail view of a counterweight construction for the presser.

Figure 1:
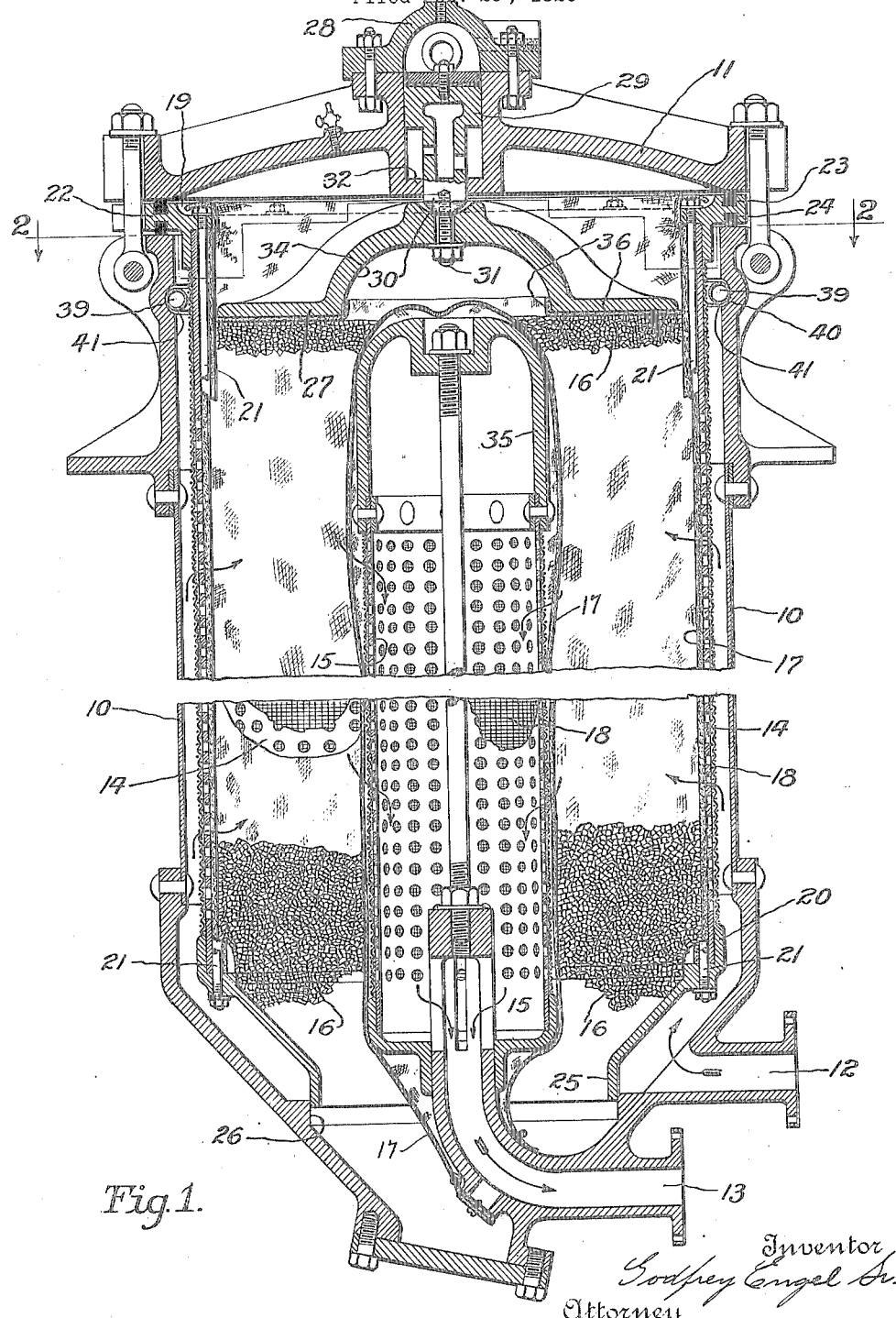

The filter herein illustrated is of the vertical type embodying a substantially cylindrical casing 10 having a removable cover 11 and provided in the lower portion thereof with suitable inlet and outlet passages 12 and 13.

Within the casing are the two screens 14 and 15 disposed in spaced relation one within the other and between which a body 16 of charcoal or other loose granular filtering material is confined. The perforations in these screens are of a size to properly confine the granular material and they are shown as covered with wire gauze 18. To prevent escape of the finer particles of the granular material, I prefer to interpose a blanket or blankets 17 between the mass of filtering material and the confining screen or screens. These blankets or bags catch and hold the finer particles of filtering material and also assist in the filtering operation.

The outer screen is of novel construction, in that the screen element 14 is supported between the upper and lower annular heads or rings 19 and 20, the two rings being clamped together with the screen interposed therebetween by the tie bolts 21 which form in effect links suspending the screen and the lower head from the upper head.

This screen is supported in the casing by providing the upper head thereof with an outstanding annular flange 22 clamped between the opposing faces of the cover and the end of the casing. This outstanding flange is shown as carrying the gaskets 23 and 24 at its upper and lower faces to form the packing between the ring and the cover and body portions of the casing. This construction enables the assemblage of the parts by simply lowering the screen into the casing and then clamping the cover over the outstanding flange of the screeen.

At the lower end the screen is shown as having a sliding connection with the casing so as to allow for expansion and contraction of the parts without leakage. This expansion joint is shown as formed between an annular neck extension 25 on the lower head or ring of the screen and the annular wall 26 of a socket formed in the lower head of the casing. This construction also is a material aid in the setting up of the filter, the interfitting parts providing a guide which assists materially in the proper mounting of the screen within the filter casing.

The granules of the confined mass of filtering material are controlled and held against individual movement by means of a pressure applying device shown in the form of the plate 27 resting on the upper end of the annular body of filtering medium confined between the two screens. This presser plate on account of its size will ordinarily be sufficiently heavy to hold the mass under good control, but I prefer to employ in addition to the force of gravity thus utilized, a power device by which various degrees of force may be applied to the presser. This power device I have shown in the form of a hydraulic cylinder 28 carried by the cover within which operates a piston or plunger 29 connected with the presser. The connection between this piston and the presser plate is preferably in the form of a rocking joint, such as the ball joint indicated at 30 so as to enable the presser to tilt more or less and accommodate itself to the contour of the filtering bed.

This plunger is shown as loosely connected with the presser plate through the medium of a bolt 31 so that the plunger may be operated to retract or lift the presser plate. The downward or outward movement of the piston is shown as limited by a shoulder 32 at the lower end of the cylinder and the cylinder is shown as constructed with a removable head which can be taken off for the purpose of inspection or disassemblage of the parts. The presser plate is shown as recessed at its central portion at 34 so that it may work down over the upstanding head 35 of the inner screen element. A blanket, such as that indicated at 36, may be interposed between the under face of the presser plate and the upper end of the filtering bed.

With this construction it is possible by regulating the pressure to compress the filtering medium to any desired extent and it is possible also at any time to vary the degree of compression to suit conditions as they arise. This possibility of control is particularly advantageous for handling different kinds of liquids. This construction also permits of the pressure being released when it is desired to clean the filter. In such a case the removal of the pressure permits a certain amount of circulation of the granules, enabling them to free themselves of the collected material.

In Figure 4 I have illustrated a modification of the presser idea in which the power device is eliminated and the presser plate is made in the form of a heavy annular weight 37 sufficiently heavy to exert the proper degree of compression on the loose filtering medium. This weight is shown as simply resting on the mass of filtering material and it is shown as formed with recesses 38 to receive grapple hooks which may be employed for lifting it.

The outer screen is cleaned and purified in my invention by flushing it with jets from a steam pipe 39 shown as encircling the upper end portion of the strainer and seated in the annular groove or recess 40 in the inner wall of the case. This spray pipe is shown simply as formed with jet openings 41 in the under side thereof arranged to direct the steam downward over the outer surface of the screen. The spray thus provided serves to loosen any foreign matter adhering to the screen and also has a purifying and cleaning effect on the entire interior of the filter.

In Figure 5 I have shown how the presser plate may, when desired, be counterweighted so that it may be readily lifted to remove the pressure from the granular material. In this view the counterweight which is indicated at 50 is connected with the presser plate by means of a flexible cable 51 extended over pulleys and through a stuffing box 52 into engagement with the plunger which operates the presser. This counterweight may be increased or diminished at will and may be utilized as a means for entirely lifting the presser off the body of granular material. This latter feature is particularly important when flushing out the filter.

What I claim is:

1. A filter casing having a removable cover, a screen removably supported in the casing and having an annular outstanding flange engaged between the cover and the body of the casing and a sliding expansion joint between the casing and the opposite end of said screen.

2. In a filter, a supporting head, a screen engaged at one end with said head, a ring engaged with the opposite end of said screen, tie bolts securing said ring to the head with the screen interposed therebetween, said ring having an annular neck and a filter casing enclosing the screen and having an annular portion slidably engaged by said neck.

3. In a filter, a supporting head, a screen engaged at one end with said head, a ring engaged with the opposite end of said screen, tie bolts securing said ring to the head with the screen interposed therebetween, said ring having an annular neck, a filter casing enclosing the screen and having an annular portion slidably engaged by said neck and an outstanding annular flange on the head and engaging the casing.

4. A filter comprising a casing, a screen supported within and secured to the casing at one end and a sliding expansion joint between the casing and the opposite end of the screen.

5. In a filter, a screen having an annular neck at one end and a filter casing having an annular portion slidably engaged by said neck and providing in conjunction therewith an expansion joint.

6. A filter comprising a casing having a removable cover, a head having an outstanding annular supporting flange held between the casing and cover, a screen engaged at one end with said head, a supporting ring engaged with the opposite end of said screen and having a sliding connection with the casing, tie rods fastening the supporting ring to the head whereby upon removal of the cover the head with the attached screen and supporting ring may be lifted out of the casing, the sliding joint permitting such disconnection of the ring from the casing.

In witness whereof, I have hereunto set my hand this 17th day of February, 1920.

GODFREY ENGEL, Sr.